A. J. KRICK & C. E. THOMPSON.
LUBRICATOR.
APPLICATION FILED JULY 6, 1908.
946,374.
Patented Jan. 11, 1910.
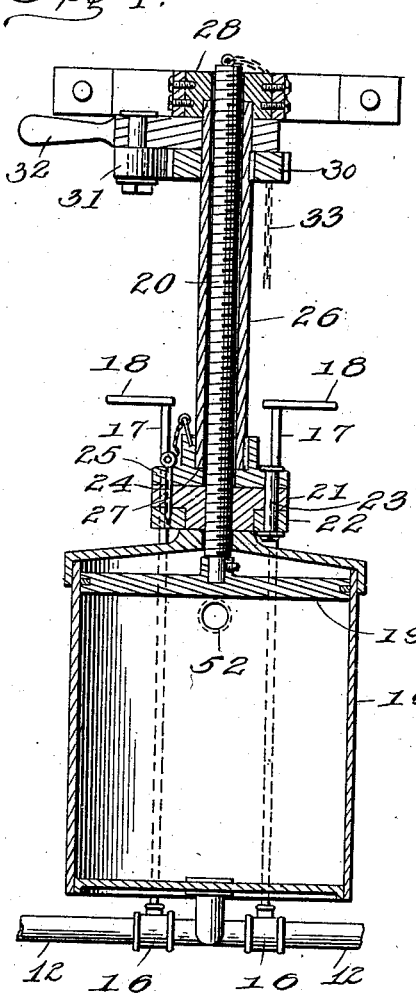
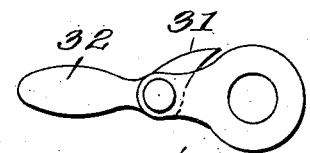
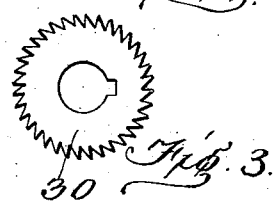
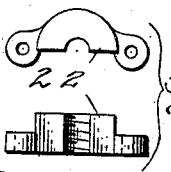
WITNESSES:
INVENTORS
A. J. Krick.
C. E. Thompson.
BY
Attorney

UNITED STATES PATENT OFFICE.

AUGUST J. KRICK AND CHARLES E. THOMPSON, OF DENVER, COLORADO.

LUBRICATOR.

946,374.  Specification of Letters Patent.  Patented Jan. 11, 1910.

Application filed July 6, 1908. Serial No. 442,185.

*To all whom it may concern:*

Be it known that we, AUGUST J. KRICK and CHARLES E. THOMPSON, citizens of the United States, residing at Denver, in the county of Denver and State of Colorado, have invented certain new and useful Improvements in Lubricators, of which the following is a specification.

This invention relates to lubricators of that class embodying a tank and a mechanism for forcing out the contents thereof, and the object thereof is to provide an improved construction which is generally free from all unnecessary complications, and is efficient in its operation.

In the accompanying drawings, Figure 1 is a vertical section of the supply tank and the force feed mechanism. Figs. 2 to 5 are details.

Referring specifically to the drawings, 10 denotes a lubricant-tank or reservoir. From the tank supply-pipes 12 run in opposite directions, the discharge ends of the pipes being fitted with nozzles (not shown) for directing the lubricant. Each pipe has a valve 16 in order that the flow of lubricant in either one or both of said pipes may be controlled. The stem 17 of each valve extends upwardly so as to be in easy reach of the operator, and said stems are provided with handles 18.

The lubricant contained in the tank is forced to its destination by means of a plunger 19 working in the tank. The plunger is operated by a traveling screw-stem 20 working in a nut mounted on top of the tank. The nut is in two sections indicated at 21 and 22, respectively, in order that the screw-stem may be released to provide for a quick return of the plunger when it reaches the limit of its downward movement. The nut sections are connected by a hinge-pin 23, and are held in operative position by a pin 24 passing through an opening in a block 25 mounted on top of the nut sections and through alined openings in said sections. The hinge-pin 23 also passes through an opening in the block 25 so that when said block is rotated the nut will also rotate. The block 25 has a central opening through which the stem 20 loosely passes, and said opening is enlarged to receive the lower end of a tubular stem 26 which seats on the shoulder 27 formed by said enlargement. The stem 26 incloses the stem 20, the diameter of the bore of the former being such that the latter may slide freely up and down therein. The upper end of the stem 26 is mounted in a bracket 28 secured to and projecting from a suitable support. To the stem 26 is keyed or otherwise secured a ratchet-disk 30 which is engageable by a pawl 31 carried by a handle 32 rotatably mounted on said stem. Upon turning said handle in the proper direction, the pawl engages the teeth of the ratchet-disk, whereupon the stem 26 is rotated. The block 25 is keyed or otherwise made fast to the stem 26 so that said block will also turn with the stem, and as the nut sections 21 and 22 are connected to the block, said sections will also turn with the same. When the nut sections are turned on the screw-stem 20, as stated, said stem will travel downwardly whereby the plunger 19 is forced downwardly in the tank and the lubricant is forced to its destination. Upon opening the nut sections, the stem 20 is released, and a quick return of the plunger may be had by pulling the stem up by means of a chain 33 connected to its upper end.

When desired, the handle 32 is given a few swings to operate plunger 19 and thereby dispense a desired amount of the lubricant in a manner that will be perfectly apparent from the foregoing.

When the tank 10 is empty, the stem 20 is released in the manner already described, and the plunger 19 is elevated by a pull of the chain 33. The tank has a filling orifice 52 provided with a suitable closure.

We claim:

1. A lubricator comprising a tank, discharge-pipes leading therefrom, a plunger working in the tank, a screw plunger-stem extending through the end of the tank, a nut on the outside of the tank, detachably engaging the plunger-stem, a tubular stem inclosing the plunger-stem and connected at one end to the nut, a bearing bracket for the other end of the tubular stem, means for rotating said tubular stem, and means for retracting said plunger and stem when the nut is disengaged.

2. A lubricator comprising a tank, discharge-pipes leading therefrom, a plunger working in the tank, a screw plunger-stem extending through the end of the tank, a nut on the outside of the tank, in which nut the plunger-stem works, said nut comprising separable sections, a rotatable tubular stem receiving the plunger-stem, and connected to the nut, means for rotating said tubular stem and nut, and a hoisting device connected to the plunger-stem.

In testimony whereof we affix our signatures in presence of two witnesses.

AUGUST J. KRICK.
CHARLES E. THOMPSON.

Witnesses:
CHARLES F. LEIMER,
MAE L. ATHERTON.